(No Model.)
H. W. HILL.
FRICTION CLUTCH PULLEY.
No. 312,122. Patented Feb. 10, 1885.
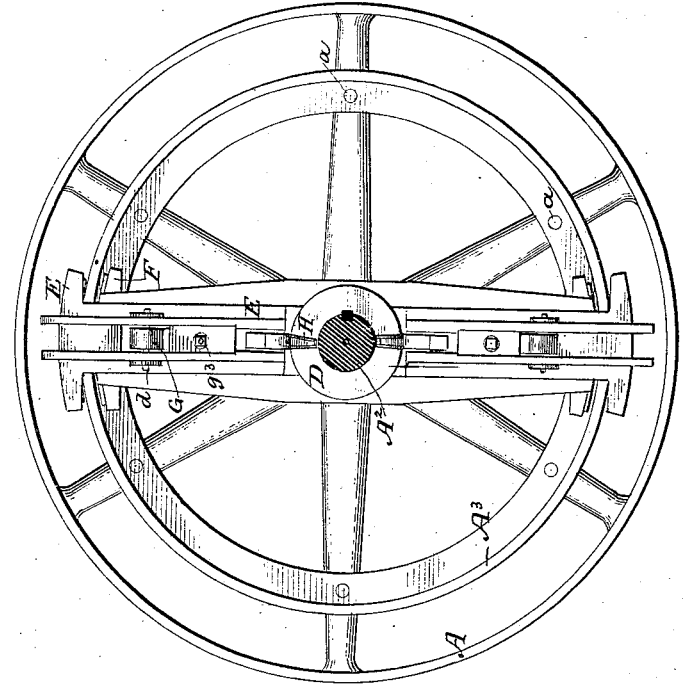
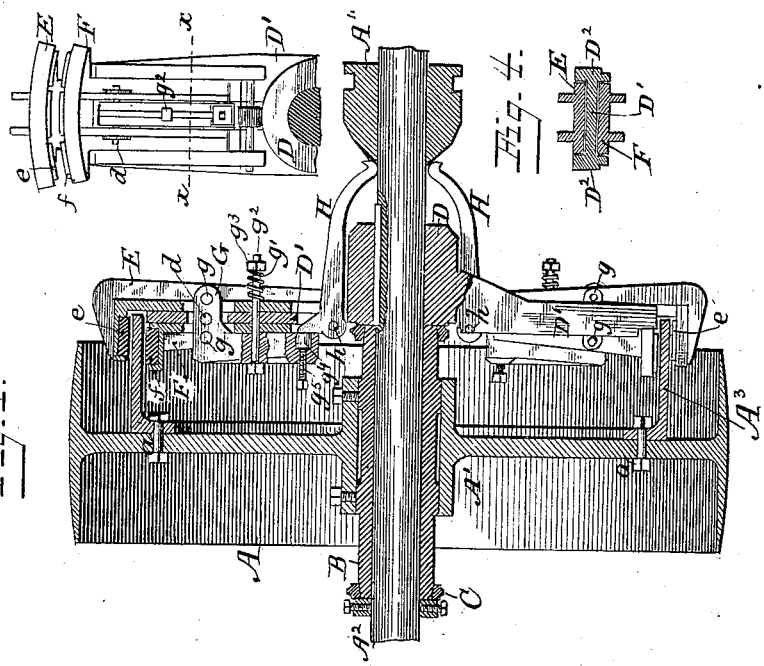
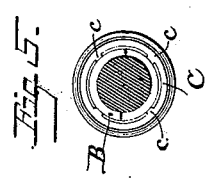
Witnesses:
D. C. Hills
W. B. Masson
Inventor:
Harry W. Hill
by E. E. Masson
atty.
N. PETERS, Photo-Lithographer, Washington, D. C.

UNITED STATES PATENT OFFICE.

HARRY W. HILL, OF MONTGOMERY, ALABAMA.

FRICTION-CLUTCH PULLEY.

SPECIFICATION forming part of Letters Patent No. 312,122, dated February 10, 1885.

Application filed October 6, 1884. (No model.)

*To all whom it may concern:*

Be it known that I, HARRY W. HILL, a citizen of the United States, residing at Montgomery, in the county of Montgomery and State of Alabama, have invented certain new and useful Improvements in Friction-Clutch Pulleys, of which the following is a specification, reference being had therein to the accompanying drawings.

My invention relates to improvements in friction-clutches in which a rim secured to a pulley is grasped by suitable means controlled by a loose sleeve upon the shaft thereof; and the objects of my improvements are to provide peculiarly constructed and pivoted levers to bear upon both sides of the rim and grip it at the same time, and also to provide means to protect the hub against wear upon the axle.

My invention will first be described in connection with the drawings, and then be pointed out in the claims.

In the drawings, Figure 1 is a vertical section of a friction-clutch constructed in accordance with my invention. Fig. 2 is a front view of the same. Fig. 3 is a view of the inner face of one half of the clutch detached from the pulley. Fig. 4 is a transverse section on line $xx$ of Fig. 3. Fig. 5 is a transverse section of the shaft and end view of its sleeve and collar.

Similar letters refer to similar parts in all the figures.

In the drawings, A represents a pulley, the hub A' of which has a bore of larger diameter than the shaft $A^2$, upon which it is intended to be mounted, and is adapted to receive a loose hub or sleeve, B, which is made to fit into the hub proper of the pulley, but project on each end thereof. This sleeve B is made in two parts or halves, that are held together at the ends by means of two internally-tapering collars, C, having four internal bosses or projections, c, to insure a ready fit on the tapered ends of the sleeve B without finishing or turning said ends of the sleeve or the collars, and thereby reducing the cost of manufacture. It is evident that since the sleeve is made in two parts it can, when worn, be taken from the shaft without removing the pulley, and if babbitted can be rebabbitted and placed back within the hub of the pulley, or it can be replaced by a new one at a small cost. The pulley is provided with a friction-ring, $A^3$, fastened to its arms by means of bolts $a$.

Upon the shaft $A^2$ is secured, by means of set-screws or of a key, a hub, D, provided with oppositely-disposed arms D', and upon these arms are mounted the radial outer clutch members, E, and the radial inner clutch members, F, by means of right-angle levers G and bolts $g$ passing therethrough, while the levers G are pivoted at $d$ to the arms D, half-way between the pivot-bolts $g$. The outer ends of the levers E and F are shod with blocks of wood, $e f$, and are made to rotate around the ring $A^3$. As the fulcrum of the right-angle lever G is at $d$, between the pivot-bolts $g$, it is evident that if the conical clutch-sleeve $A^4$ is moved upon the main shaft toward the hub D the outer ends of the bell-crank levers H, pivoted at $h$ to the arms D, are spread apart, and their inner ends, bearing against the lower portion of the right-angle levers G, will give to the clutch member F a radially-outward and to the member E an inward movement until they come in contact with the ring $A^3$ and clutch both sides thereof at the same time. This clutching can clearly be understood, and as the pulley A is a loose pulley, while the hub of the arms D' is keyed to this shaft, the said pulley becomes fastened to the arms D' and is caused to revolve with them. These arms D' have flanges $D^2$ on their sides, to laterally support the clutch members E and F. When it is desired to stop the machinery driven by the pulley A or cause the latter to become a loose pulley, the conical clutch-sleeve $A^4$ is pulled away from the hub D, and thus the pressure produced by their inner ends against the right-angle levers G is removed, and the inner end of said lever is pulled outwardly by a spring, $g'$, coiled upon a bolt, $g^2$, having one end passing through said lever, while the opposite end carries a nut, $g^3$, for the spring to abut against. The inner end of the lever G is provided with a small cylindrical block, $g^4$, for the inner end of the lever H to bear against, and a set-screw, $g^5$, entering the lever G in the rear of said block, can be made to force it out, and thus make up for the wear thereof without altering the position of lever H.

The bolt $g^2$ and its spring $g'$ may be dispensed with, and the device will still properly perform its functions, as, the clutch member E being longer and heavier than the clutch member F, said clutch member E is by centrifugal force thrown outwardly, and at the same time forces the clutch member F inwardly, and, through the right-angle lever G, releases the levers H.

Having now fully described my invention, I claim—

1. In combination with a pulley mounted loosely upon its shaft and provided with a concave and a convex frictional rim, $A^3$, the hub D, secured upon said shaft and provided with angular levers and radial arms, the inner member provided with convex frictional blocks and the outer member provided with concave frictional blocks, each series of blocks being adapted to simultaneously recede from said frictional rim, substantially as and for the purpose described.

2. In combination with a pulley and its rim, $A^3$, having concave and convex frictional surfaces, the hub D, secured upon its shaft and provided with radial arms, the angle-levers G, pivoted thereto, and clutch members E and F, pivoted to the latter and provided with concave and convex frictional surfaces, substantially as and for the purpose described.

3. In combination with a pulley loose upon a shaft, the hub D, secured upon said shaft and provided with radial arms and lateral flanges, and between said flanges clutch members provided with concave and convex frictional blocks, substantially as and for the purpose described.

4. In combination with a pulley and conical clutch-sleeve loose upon a shaft, the hub D, secured upon said shaft and provided with radial arms, the bell-crank levers H and angle-levers G, pivoted upon said arms, and clutch members pivoted upon the levers G, to simultaneously advance with the lever G toward the frictional rim of the pulley, substantially as described.

5. In combination with hub D and its arms D', the angle-levers G, their adjustable blocks $g^4$, and bell-crank levers bearing against the latter, substantially as and for the purpose described.

6. The combination of the hub D, having arms D', the angle-levers G, pivoted to the latter, and the clutch members E and F, with bolt $g^2$ and spring thereon, substantially as and for the purpose described.

In testimony whereof I affix my signature in presence of two witnesses.

HARRY W. HILL.

Witnesses:
J. R. SAYRE,
CHAS. B. WILKINS.